United States Patent [19]

Bobeczko

[11] 4,043,444

[45] Aug. 23, 1977

[54] CUP ACCUMULATOR ASSEMBLY

[75] Inventor: Michael S. Bobeczko, Castro Valley, Calif.

[73] Assignee: Kaiser Aluminum & Chemical Corporation, Oakland, Calif.

[21] Appl. No.: 700,439

[22] Filed: June 28, 1976

Related U.S. Application Data

[63] Continuation-in-part of Ser. No. 609,633, Sept. 2, 1975, abandoned.

[51] Int. Cl.² .............................................. B65G 47/08
[52] U.S. Cl. .................................... 198/557; 198/616; 198/866; 181/33 G; 221/253
[58] Field of Search .............. 198/347, 540, 544, 560, 198/616, 866, 557; 214/16 B; 232/43.3; 211/49 D, 121; 181/33 G, 33 M; 221/253

[56] References Cited

U.S. PATENT DOCUMENTS

| 2,420,343 | 5/1947 | Albertoli | 198/417 |
| 3,351,154 | 11/1967 | Kodaras | 181/33 G |
| 3,404,928 | 10/1968 | Haagsma et al. | 211/49 D |
| 3,426,885 | 2/1969 | Rupert | 198/816 |
| 3,503,487 | 3/1970 | London | 198/557 |
| 3,712,846 | 1/1973 | Daniels et al. | 181/33 G |
| 3,770,560 | 11/1973 | Elder et al. | 181/33 G |
| 3,821,999 | 7/1974 | Guess et al. | 181/33 G |
| 3,921,790 | 11/1975 | Hinchcliffe et al. | 198/605 |

Primary Examiner—Evon C. Blunk
Assistant Examiner—Richard K. Thomson
Attorney, Agent, or Firm—Paul E. Calrow; John S. Rhoades

[57] ABSTRACT

An improved accumulator and storage device for metal containers provided with open and closed ends, wherein one of the major wall areas of the accumulator and storage device is of acoustical construction and wherein the containers are deposited in the accumulator and storage device in such a way that their open ends face the acoustical wall structure.

3 Claims, 5 Drawing Figures

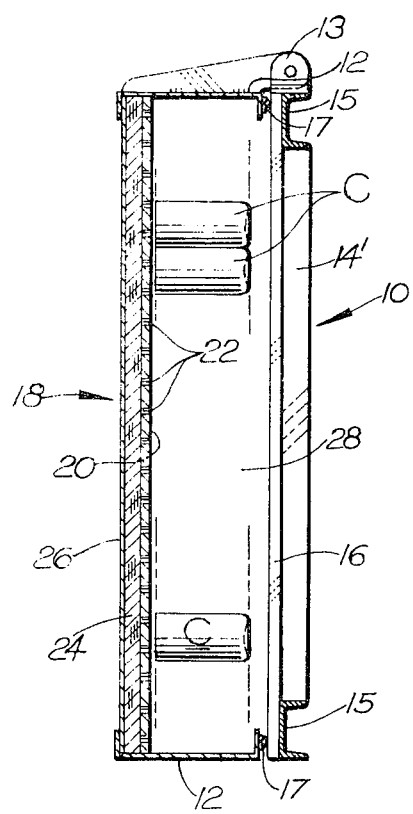
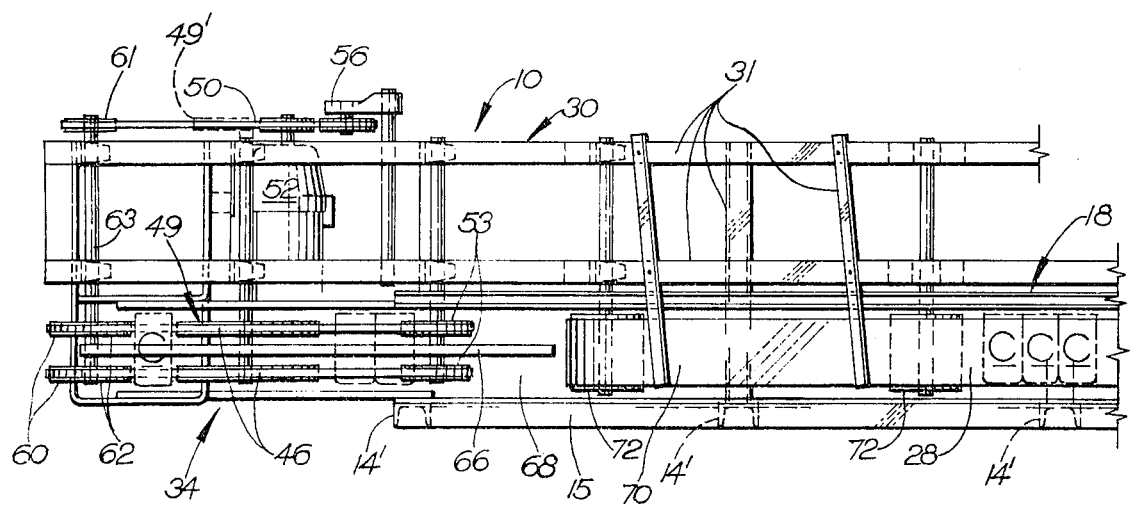

CUP ACCUMULATOR ASSEMBLY

This application is a continuation-in-part of my previous application Ser. No. 609,633, filed Sept. 2, 1975, entitled "Cup Accumulator Assembly", now abandoned.

BACKGROUND OF THE INVENTION

In the manufacture of drawn, drawn and ironed, and impact extruded metal containers and the like, it is necessary at various strategic locations along the containers' production line to provide one or more container accumulator and storage devices. These devices serve to absorb any excess overflow of containers to and from given processing stations in the processing line so that the overall container processing line will function relatively smoothly and with a minimum amount of malfunctions and jams. The containers are usually deposited in the top of an accumulator and storage device and the containers normally flow under the influence of gravity from the top to the bottom of the device. The accumulator device can, if desired, be equipped with conveyor means for assisting container flow to and through the accumulator and container exiting from the bottom of the device at the proper time.

In the past, these container accumulator and storage devices have been so constructed that the noises and sounds emanating therefrom were quite pronounced due to the containers contacting or banging into each other as they moved through such devices, particularly when the containers were made of metal. The instant invention is concerned with an accumulator and storage device construction that has improved noise and sound attenuating properties and involves concepts constituting improvements over the sound absorbing equipment and/or article handling equipment represented in prior art U.S. Pat. Nos. 1,748,039; 2,420,343; 2,769,211; 2,498,048; 2,870,663; 3,159,238; 3,021,914; 3,351,154; 3,404,928; 3,426,885; 1,966,511; 2,287,823; 2,656,085; 3,821,999; 3,770,560; 3,503,487; 3,712,846 and 3,921,790.

SUMMARY OF THE INVENTION

In an effort to reduce the noises and sounds in a container plant in the area of container accumulator and storage devices, it is proposed that these devices be provided or equipped with at least one major wall area that has sound absorbing properties and that the containers be deposited into the top of the accumulator and storage devices with their open ends facing such acoustical wall or wall area. The structure of the accumulator and storage device is such that the containers are adapted to retain this same orientation during their full passage through the device and the energy of the sound waves is ultimately dissipated through the friction generated by contact of the disturbed air molecules with the acoustical wall structure of the storage device.

BRIEF DISCUSSION OF DRAWINGS

FIG. 4 is a cross-sectional view taken generally along the line 4—4 of FIG. 2 with parts removed; and FIG. 5 is a fragmentary top plan view with parts removed of the accumulator device of FIG. 2 when taken along line 5—5 thereof.

DETAILED DESCRIPTION

Figure 1:
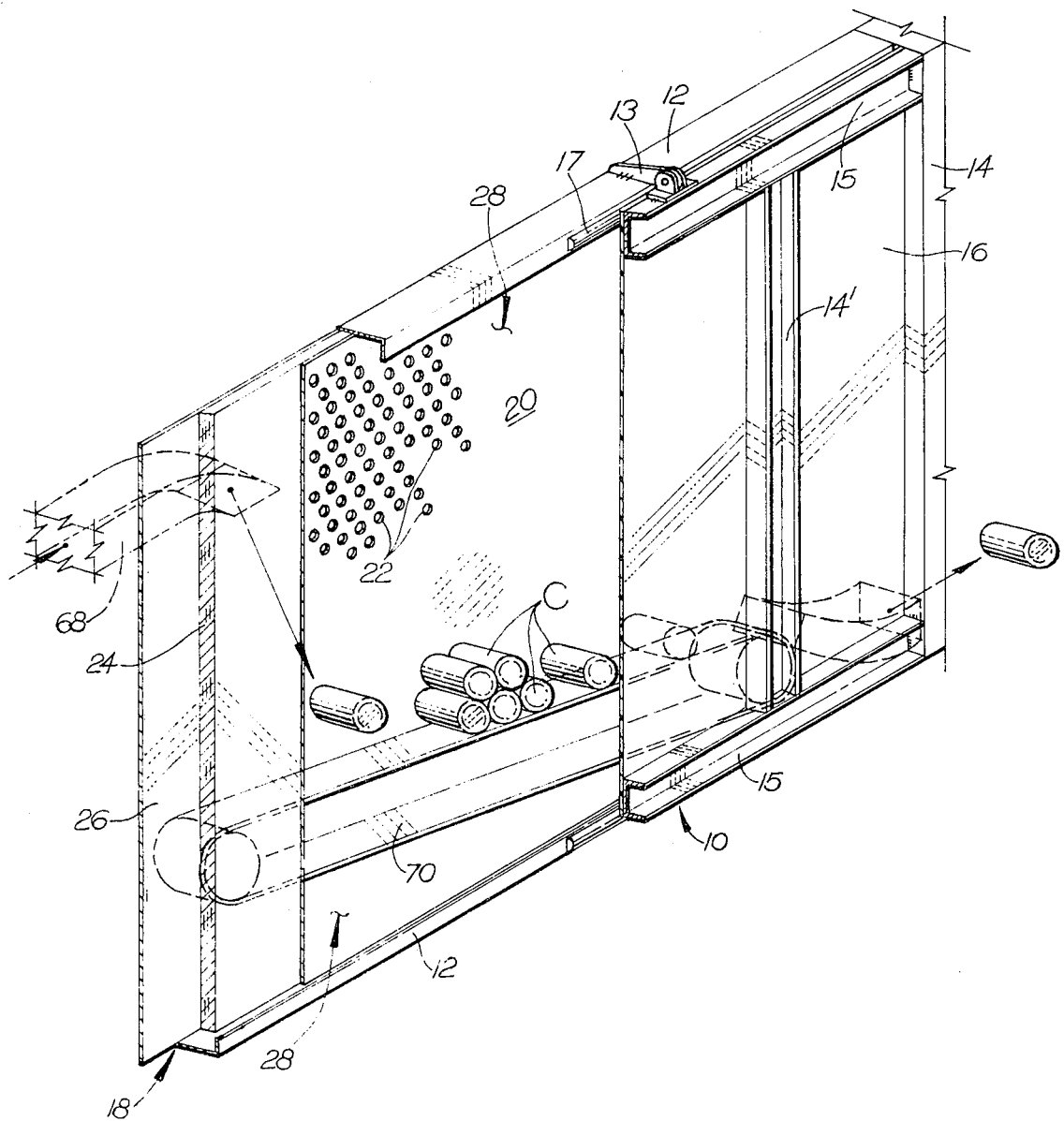
FIG. 1 is a schematic perspective view of a typical container accumulator and storage device equipped with the improved acoustical wall structure of the instant invention.
Figures 2, 3:
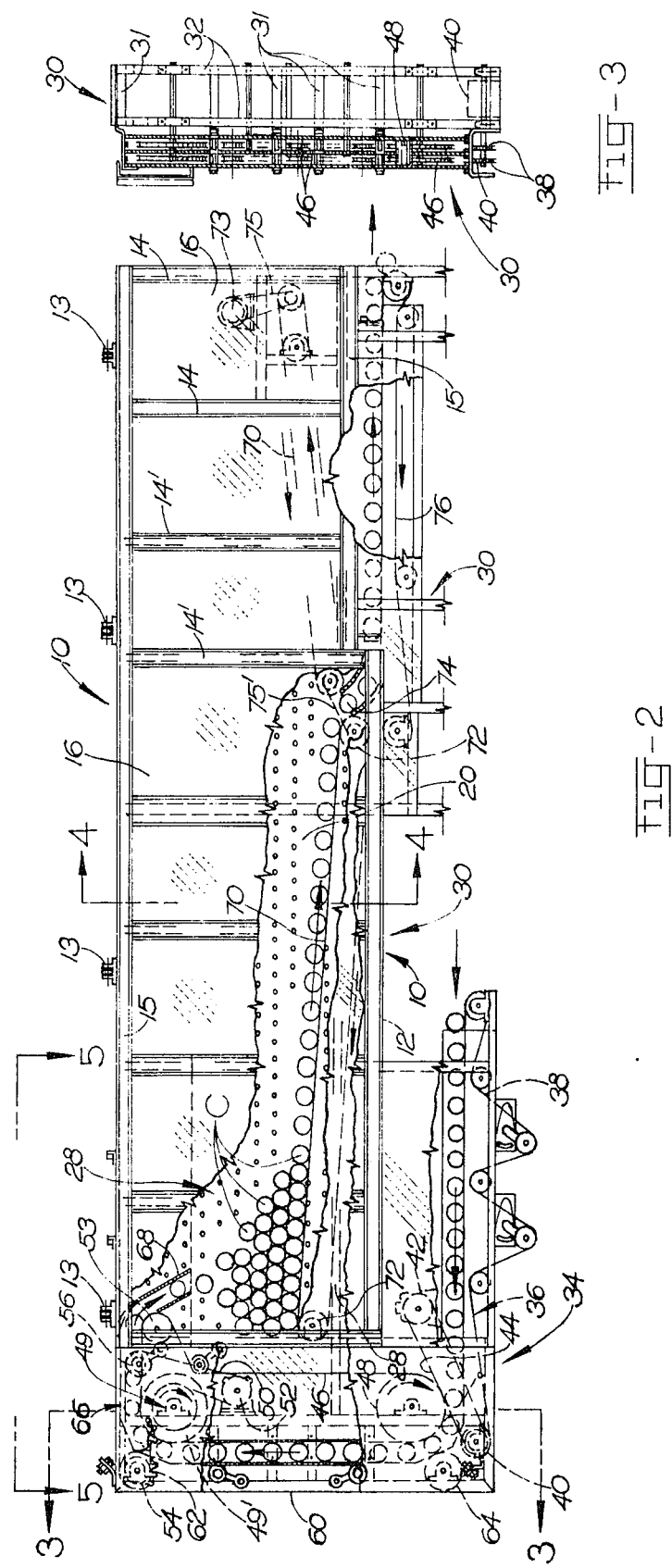
FIG. 2 is a somewhat detailed and partly cut away side elevational view of the accumulator and storage device illustrated in FIG. 1.
FIG. 3 is a sectional view taken along line 3—3 of FIG. 2 with parts removed.

With further reference to the drawings and, in particular, FIGS. 1 and 2, a container accumulator and storage device, which may be used in the practice of the instant invention can be generally comprised of an elongated housing or frame assembly 10 made up of the usual horizontal top and bottom channel members 12 that are disposed in selected spaced relationship to each other and secured together at their ends by the vertically disposed channels 14 or the like. Pivotally secured by hinge assemblies 13 to the top channel member 12 and forming a main sidewall 16 is a sheet of clear plastic material, e.g. clear, acrylic material, so that the interior of the accumulator and storage device can be readily visible to the operator from one side of the same. Plastic wall 16 is reinforced by the usual frame elements 14' and 15 to which the plastic material is anchored and wall 16 is appropriately sealed and cushioned against frame channels 12 and 14 by the usual gasketing 17. Side wall 16 is locked by standard bolt means (not shown) to the bottom channel member 12 making up the frame assembly 10.

The wall section 18 making up the other major wall section of housing 10 is comprised of a composite panel provided with an inner perforated liner sheet 20 having the open areas or perforations 22. Perforations 22 preferably comprise between 30% and 45% of the surface area of sheet 20 and these perforations can have either a random or regular pattern or various combinations thereof.

Sheet 20 is located in spaced relation to and mechanically affixed by pin means (not shown) to a metal backer sheeting 26 also making up wall section 18. An outer sheeting of sound absorbtion material 24 of the appropriate thickness and composition such as that sold by Scott Paper Company of Chester, Pa., under the trademark "Pyrell" is appropriately sandwiched between sheets 20 and 26 in the manner shown in FIGS. 1 and 4. Composite panel 18 made up of elements 20, 24 and 26 acts in conjunction with the opposing transparent wall 16 and end members 14 to form an elongated container receiving chamber 28 of a shallow width, which is slightly greater than the length of the containers C to be stored. The depth and length of chamber 28 on the other hand are each substantially greater than the length of the various containers C to be accommodated in chamber 28. Thus, as the containers C are placed in the chamber 28 they can be disposed and oriented in chamber 28 such that their open ends face composite wall section 18 without any danger of changing such orientation during their passage through housing 10. The overall housing assembly 10 is mounted upon a framework 30 made up of horizontal and vertical sections 31 and 32 secured together and it can be located in an elevated position in the container plant in a well-known fashion.

A conveyor system 34 is provided for delivering the containers C sideways to the top of chamber 28 of the accumulator and storage housing 10 and with the open ends of the containers facing wall section 18 whereby the containers C can flow under the influence of gravity from the top to the bottom of chamber 28 after which they are discharged through a suitable discharge device onto a discharge conveyor for further handling. The means for delivering containers C and removing the containers C from device or housing 10 will now be described.

Containers C are elevated to a position atop the container accumulator and storage housing 10 by means of an endless conveyor 36 comprised of a plurality of endless and generally horizontally disposed conveyor belts 38. These belts are trained about the usual take-up rollers and pulleys and the main drive pulley assembly 40 driven in a standard fashion by a motor 42 through the medium of an endless drive belt 44 in a manner well known in the art. Containers C are lifted upwardly as they leave the horizontal belts 38 by means of a further series of generally vertically arranged cooperating belts 46 and 60. Belts 46 are trained about two main drive pulley assemblies 48 and 49 and belt take-up devices 53. Pulley assembly 49 is powered by the endless power takeoff belt 50 ultimately driven by drive motor 52 and belt 50 is trained about the usual pulley take-up device 56. Belt 50 also serves as the direct drive for pulley 49' of the pulley assembly 49. Belts 60 trained about pulleys 62 and 64 can be driven by means of a pulley 61 connected to belt 50, with pulley 61 also being mounted on the same shaft 63 upon which pulleys 62 are mounted adjacent the corner 54 of the framework 30.

When the containers C reach the topmost position as shown in FIG. 2, they are transferred to and supported by a horizontal sector of pulley belts 66 and held against the pulley belts by hold down bar 66 which ultimately leads downwardly and into the down spout or discharge chute 68 into the bottom of the chamber 28 of accumulator housing 10.

If desired, and in accordance with standard practice, the chamber 28 can be provided with one or more endless conveyor belts 70 of conventional design and trained about the pulleys 72. These belts can be simple idler belts driven under the urging of the containers C as they pile up on the belts or the belts can be positively driven by means of a motor 73 mounted on frame 30 outside chamber 28 and connected to a power belt 75. Belt 75 drives one of the pulleys 72 for one belt 70 and a pulley 72 for the opposing end of this first belt is appropriately connected by the schematically shown power belt means 75' of FIG. 2 to the pulley 72 for the other belt so that the top sectors of both belts 70 will simultaneously move toward a discharge chute 74. Thus, the containers C as they move down the various belts 70 will pass into discharge chute 74, which then acts to feed the containers C onto discharge conveyor belt 76 leading to a further container handling station. Belt 76 is driven in a fashion well known in the art by a motor (not shown) and all of the different conveyor belts 38, 46, 60, 70 and 76 can be stopped and started electronically by appropriate controls that constantly monitor the various operations taking place along the can line where the accumulator assembly 10 is located. In lieu of conveyors 70, the bottom of the chamber 28 can simply have inclined surfaces simulating a V and leading to discharge chute 74.

It will be noted that in all of the handling of the containers C during entry and passage through the accumulator housing 10 the containers are oriented such that they are disposed upon each other in a sideways relation with their open ends facing the composite acoustical wall 18. Since the containers C will normally have but one open end, their closed ends will face the clear panel wall 16. Thus, the sound waves resulting from the containers bumping and banging against each other as they move through the chamber 28 will be directed, primarily, toward wall section 18. As this occurs, the various sounds and noises will be constantly muffled and attenuated within chamber 28 as the individual sound waves penetrate the openings 22 in sheet 20 and the energy of such sound waves becomes dissipated upon its conversion to heat due to the frictional contact of the various sound wave disturbed air molecules with the acoustical material 24 of wall section 18.

An advantageous embodiment of the invention has been shown and described and various changes may be made therein without departing from the spirit and scope thereof.

What is claimed is:

1. An accumulator and storage device for metal containers that are provided with one open and one closed end, said device being comprised of a relatively soundproof and enclosed container receiving and storage chamber, said chamber having a top, bottom, two end, and two side walls and said chamber having a width slightly in excess of but a depth and length both greater than the length of the containers to be stored, one of the sidewalls of the said chamber which faces the open ends of the containers and also constitutes a major wall area of the chamber comprising an acoustical wall that includes an inner perforated liner sheet and an outer backer sheet of sound absorptive material arranged and disposed adjacent the liner sheet, conveyor means for initially selectively depositing and orienting the containers in the said enclosed chamber with their open ends facing the said acoustical wall and said chamber also being provided with container outlet means in the lower portion thereof.

2. A storage device as set forth in claim 1 wherein the total open area of said perforated liner sheet comprises between 30% and 45% of the entire surface of said perforated liner sheet which is directly exposed to the open ends of the containers in said chamber.

3. A device as set forth in claim 1 including an endless conveyor belt means located in the lower portion of said chamber for receiving and moving stored containers to said outlet means.

* * * * *